UNITED STATES PATENT OFFICE.

HERMANN VIETH, OF LUDWIGSHAFEN, GERMANY, ASSIGNOR TO KNOLL & CO., OF SAME PLACE.

PROCESS OF RENDERING ICHTHYOL ODORLESS.

SPECIFICATION forming part of Letters Patent No. 625,480, dated May 23, 1899.

Application filed February 1, 1898. Serial No. 668,749. (No specimens.)

*To all whom it may concern:*

Be it known that I, HERMANN VIETH, a subject of the Duke of Anhalt, and a resident of Ludwigshafen-on-the-Rhine, Kingdom of Bavaria and Empire of Germany, have invented a new and useful Improvement in the Process of Freeing Ichthyol Compounds from their Offensive Odors, of which the following is a specification.

The preparations or compounds of ichthyol, especially the ichthyolsulfonate of ammonium, possess a penetrating odor which materially lessens the value of this important agent for all therapeutic and cosmetic purposes. Efforts have already been made to remove such odor, which is caused by the presence of a small admixture of an ethereal oil, by means of distillation with steam. Such operation, however, could not be performed without materially decomposing the ichthyol compounds themselves. (See Bernhard Fischer, "*Die Neueren Arzneimittel,*" fifth edition, page 312.) Especially the free ichthyolsulfonacid is readily decomposed when its watery solution is heated to the boiling-point at ordinary atmospheric pressure and then treated with steam. The residual acid soon becomes insoluble in water and in alcohol, thereby becoming useless.

In taking up this question of purifying the ichthyol compounds I have found that treating them by means of steam distillation will, nevertheless, lead to a satisfactory result if care is taken not to allow the temperature of the steam to surpass a certain limit and if the distillation is carried on under diminished pressure. The salts of the acid are less sensitive to temperatures of and above 100° centigrade than the free acid is; but they will, nevertheless, decompose to a certain degree if treated with superheated steam under atmospheric pressure for a sufficient length of time to carry off perfectly the strongly-smelling oil.

The following example illustrates my process: One hundred kilograms of ichthyol and three hundred liters of water are placed in a vacuum-pan. The pressure in the pan is then reduced to about one-sixth of an atmosphere and the pan heated till the liquid is boiling— that is to say, to about 60° centigrade. Superheated steam of about 150° centigrade is then led into and over the surface of the boiling solution so long as any ill-smelling oil is passing away—that is, for six to ten hours. When the smell has perfectly disappeared, the solution is again reduced by evaporation to one hundred kilograms, thereby becoming directly ready for use as a purified ichthyol preparation.

Treating ichthyol with steam for the purpose of removing the ethereal oil is already carried out by Schatten and Baumann with more or less effect of decomposing the ichthyol; but that is not the substance of my invention.

The essential characteristic of this invention consists in the fact that said decomposition of the ichthyol compounds when treated with steam can be perfectly avoided by carrying out the distillation under reduced pressure of, for example, one-sixth of an atmosphere, and in a far shorter time—*i. e.*, in about six to ten hours instead of four to six days.

What I claim as my invention is—

The process of freeing ichthyol compounds of their strong odor consisting in treating such compounds by distillation with steam under a pressure less than that of the atmosphere, substantially as described.

In testimony that I claim the foregoing as my invention I have signed my name, in presence of two witnesses, this 15th day of January, 1898.

HERMANN VIETH.

Witnesses:
OSWALD KRUG,
JACOB ADRIAN.